United States Patent
Wang

(10) Patent No.: US 9,523,899 B2
(45) Date of Patent: Dec. 20, 2016

(54) PIXEL STRUCTURE AND DETECTION METHOD OF PROMOTING DEFECT DETECTION RATE

(71) Applicant: Shenzhen China Star Optoelectronics Technology Co., Ltd., Shenzhen, Guangdong (CN)

(72) Inventor: Zui Wang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 174 days.

(21) Appl. No.: 14/423,431

(22) PCT Filed: Feb. 6, 2015

(86) PCT No.: PCT/CN2015/072367
§ 371 (c)(1),
(2) Date: Feb. 23, 2015

(87) PCT Pub. No.: WO2016/078230
PCT Pub. Date: May 26, 2016

(65) Prior Publication Data
US 2016/0342051 A1 Nov. 24, 2016

(30) Foreign Application Priority Data
Nov. 20, 2014 (CN) .......................... 2014 1 0668375

(51) Int. Cl.
*G09G 3/36* (2006.01)
*G02F 1/1362* (2006.01)
(Continued)

(52) U.S. Cl.
CPC ....... *G02F 1/136259* (2013.01); *G02F 1/1368* (2013.01); *G02F 1/13439* (2013.01);
(Continued)

(58) Field of Classification Search
CPC .................. G09G 3/3648; G02F 1/136259
See application file for complete search history.

(56) References Cited

U.S. PATENT DOCUMENTS

| 2009/0322978 A1* | 12/2009 | Peng | ................. G02F 1/136259 349/54 |
| 2012/0169951 A1* | 7/2012 | Sung | ................... G09G 3/3655 349/33 |

FOREIGN PATENT DOCUMENTS

| CN | 103235428 A | * | 8/2013 | .......... G09G 3/3648 |
| CN | WO 2014180042 A1 | * | 11/2014 | .......... G09G 3/3648 |

* cited by examiner

*Primary Examiner* — Joseph L Williams
(74) *Attorney, Agent, or Firm* — Andrew C. Cheng

(57) ABSTRACT

The present invention provides a pixel structure and a detection method of promoting defect detection rate. The pixel structure of promoting defect detection rate comprises two areas of a main pixel (10) and a sub pixel (20), and the sub pixel (20) comprises a charge sharing thin film transistor (T3) and a charge sharing capacitor ($C_{ST3}$); a gate of the charge sharing thin film transistor (T3) is electrically coupled to a charge sharing scan line (Gate2(*m*)); the charge sharing capacitor ($C_{ST3}$) is constructed by an ITO layer upper electrode plate (42), a metal lower electrode plate (2) and an insulative layer (3) sandwiched between the ITO layer upper electrode plate (42) and the metal lower electrode plate (2); the ITO layer upper electrode plate (42) and an ITO pixel electrode (41) are in a same layer, and the ITO layer upper electrode plate (42) is employed as a pixel common electrode coupled to a common voltage signal line (Com(m)), and the metal lower electrode plate (2) is coupled to a drain of the charge sharing thin film transistor (T3).

10 Claims, 7 Drawing Sheets

(51) Int. Cl.
    *G02F 1/1333*     (2006.01)
    *G02F 1/1343*     (2006.01)
    *G02F 1/1368*     (2006.01)

(52) U.S. Cl.
    CPC .. *G02F 1/133345* (2013.01); *G02F 1/134309* (2013.01); *G02F 1/136286* (2013.01); *G02F 2001/133302* (2013.01); *G02F 2001/134345* (2013.01); *G02F 2201/121* (2013.01); *G02F 2201/123* (2013.01)

step 1, providing a liquid crystal display panel for detection. The liquid crystal display panel comprises a plurality of charging scan lines (Gate1(m)), a plurality of common voltage signal lines (Com(m)), a plurality of charge sharing scan lines (Gate2(m)), a plurality of data signal lines (Date(n)) and a plurality of pixels arranged in an array; each pixel comprises two areas of a main pixel (10) and a sub pixel (20); the main pixel (10) comprises a first thin film transistor (T1), a first storage capacitor (CST1) and a first liquid crystal capacitor (CLC1) coupled with one another; the sub pixel (20) comprises a second thin film transistor (T2), a second storage capacitor (CST2) and a second liquid crystal capacitor CLC2), a charge sharing thin film transistor (T3) and a charge sharing capacitor (CST3); the charge sharing capacitor (CST3) is constructed by an ITO layer upper electrode plate (42), a metal lower electrode plate (2) and an insulative layer (3) sandwiched between the ITO layer upper electrode plate (42) and the metal lower electrode plate (2). The ITO layer upper electrode plate (42) and an ITO pixel electrode (41) are in a same layer; —1 step 2, employing the ITO layer upper electrode plate (42) of the charge sharing capacitor (CST3) as a pixel common electrode coupled to a common voltage signal line (Com(m)), and coupling the metal lower electrode plate (2) to a drain of the charge sharing thin film transistor (T3); —2 step 3, activating all the charging scan lines (Gate1(m)) at the same time or by parity, and charging all the pixels or the pixels of the corresponding parity to make both the main pixel (10) and the sub pixel (20) at the same voltage level; —3 step 4, detecting a dark spot on the liquid crystal display panel, and that the short occurs to the ITO pixel electrode (41) and the ITO layer upper electrode plate (42) of the charge sharing capacitor (CST3) in the sub pixel (20) corresponded with the dark spot is detected. —4

Fig. 7

PIXEL STRUCTURE AND DETECTION METHOD OF PROMOTING DEFECT DETECTION RATE

FIELD OF THE INVENTION

The present invention relates to a display technology field, and more particularly to a pixel structure and a detection method of promoting defect detection rate.

BACKGROUND OF THE INVENTION

The LCD (Liquid Crystal Display) possesses advantages of thin body, power saving and no radiation to be widely used in many application scope, such as LCD TV, mobile phone, personal digital assistant (PDA), digital camera, notebook, laptop, and dominates the flat panel display field.

Most of the liquid crystal displays on the present market are back light type liquid crystal displays, which comprise a shell, a liquid crystal display panel located in the shell and a backlight module located in the shell. The liquid crystal display panel is a major component of the liquid crystal display. However, the liquid crystal display panel itself does not emit light and needs the back light module to provide light source for normally showing images.

Generally, the liquid crystal display panel is formed by laminating two glass substrates and the liquid crystals are injected between the two glass substrates. At the relative inner sides of the two glass substrates, the pixel electrode and the common electrode are respectively located, and the light of backlight module is reflected to generate images by applying driving voltages to control whether the liquid crystal molecules to be changed directions.

In present LCDs, the color washout phenomenon under wide view angle happens and the situation particularly becomes more obvious in the Vertical Alignment (VA) type LCDs. As shown in FIG. 1, for improving the color washout under wide view angle of the VA type liquid crystal display, the Charge Sharing pixel design is utilized in prior art, i.e. the pixel is divided into two areas of a Main Pixel 100 and a Sub Pixel 200, and the Main Pixel 100 comprises a first thin film transistor T1, a first storage capacitor $C_{ST1}$ and a first liquid crystal capacitor $C_{LC1}$, and the Sub pixel 200 comprises a second thin film transistor T2, a second storage capacitor $C_{ST2}$ and a second liquid crystal capacitor $C_{LC2}$, a charge sharing thin film transistor T3 and a charge sharing capacitor $C_{ST3}$. Both the gates of the first thin film transistor T1 and the second thin film transistor T2 are electrically coupled to the charging scan line Gate1(m), and sources are both electrically coupled to the data line Date(n), and m and n are both positive integers, and Gate1(m) represents an mth charging scan line Gate 1, and Date(n) represents an nth data line Date; one ends of the first storage capacitor $C_{ST1}$, the second storage capacitor $C_{ST2}$, and the charge sharing capacitor $C_{ST3}$ are electrically coupled to the drain of the first thin film transistor T1, the drain of the second thin film transistor T2 and the drain of the charge sharing capacitor $C_{ST3}$, respectively, and the other ends are all electrically coupled to common voltage signal line Com(m); the gate of the charge sharing thin film transistor T3 is electrically coupled to the charge sharing scan line Gate2(m), and the drain is electrically coupled to the charge sharing capacitor $C_{ST3}$. As normal display, the charging scan line Gate1(m) is activated, and meanwhile, the charge sharing scan line Gate2(m) is deactivated, and the Main Pixel 100 and the Sub Pixel 200 are at the same voltage level; then, the charging scan line Gate1(m) is deactivated, and meanwhile, the charge sharing scan line Gate2(m) is activated, with the function of the charge sharing capacitor $C_{ST3}$, the voltage level of the Sub Pixel 200 is lower than the voltage level of the Main Pixel 100. Different voltage levels make twisted distributions of the liquid crystal molecules in two display areas different. Accordingly, the effect of improving the color washout under wide view angle is obtained. As shown in FIG. 2, FIG. 3, the charge sharing capacitor $C_{ST3}$ in the pixel utilizing the charge sharing technology of prior art is constructed by an Indium Tin Oxide (ITO) layer upper electrode plate 420, a metal lower electrode plate 20 and an insulative layer 30 sandwiched between the two plates, wherein the ITO layer upper electrode plate 420 and the pixel electrode layer 410 are in the same layer, and the ITO layer upper electrode plate 420 is coupled to a drain of the charge sharing thin film transistor T3 with a via 305, and the metal lower electrode plate 20 is employed as a pixel common electrode coupled to a common voltage signal line Com(m).

However, in practical production, the ITO residue issue may occur, and the short occurs to the ITO layer upper electrode plate 420 of the charge sharing capacitor $C_{ST3}$ and the ITO pixel electrode 410 which results in the malfunction of the charge sharing. The short problem under the same gray scale level makes the sub pixel is brighter than sub pixels of the other pixels, and the micro spot appears on the liquid crystal display panel. At present, the general detection is to activate all the charging scan lines at the same time or by parity, and charge all the pixels or the pixels of the corresponding parity to make both the main pixel and the sub pixel at the same voltage level. However, the aforesaid ITO short cases cannot be effectively detected even with such detection, and then the yield descends and the production cost increases.

SUMMARY OF THE INVENTION

An objective of the present invention is to provide a pixel structure of promoting defect detection rate, which can raise the short detection rate between the ITO layer upper electrode plate of the charge sharing capacitor and the ITO pixel electrode, and improve the micro spot issue of the production. The yield is raised and the cost is diminished.

Another objective of the present invention is to provide a detection method of promoting defect detection rate, which can raise the short detection rate between the ITO layer upper electrode plate of the charge sharing capacitor and the ITO pixel electrode, and improve the micro spot issue of the production. The yield is raised and the cost is diminished.

For realizing the aforesaid objective, the present invention provides a pixel structure of promoting defect detection rate, comprising two areas of a main pixel and a sub pixel, and the sub pixel comprises a charge sharing thin film transistor and a charge sharing capacitor; a gate of the charge sharing thin film transistor is electrically coupled to a charge sharing scan line; the charge sharing capacitor is constructed by an ITO layer upper electrode plate, a metal lower electrode plate and an insulative layer sandwiched between the ITO layer upper electrode plate and the metal lower electrode plate; the ITO layer upper electrode plate and an ITO pixel electrode are in a same layer, and the ITO layer upper electrode plate is employed as a pixel common electrode coupled to a common voltage signal line, and the metal lower electrode plate is coupled to a drain of the charge sharing thin film transistor.

The ITO layer upper electrode plate is employed as a pixel common electrode coupled to the common voltage signal line with a via hole.

The sub pixel further comprises a second thin film transistor, a second storage capacitor and a second liquid crystal capacitor coupled with one another; a gate of the second thin film transistor is electrically coupled to the charge scan line, and a source is electrically coupled to the data signal line, and a drain is electrically coupled to a source of the charge sharing thin film transistor; one end of the second storage capacitor is electrically coupled to the drain of the second thin film transistor, and the other end is electrically coupled to the common voltage signal line.

The main pixel comprises a first thin film transistor, a first storage capacitor and a first liquid crystal capacitor coupled with one another; a gate of the first thin film transistor is electrically coupled to the charge scan line, and a source is electrically coupled to the data signal line; one end of the first storage capacitor is electrically coupled to the drain of the first thin film transistor, and the other end is electrically coupled to the common voltage signal line.

As the ITO pixel electrode and the upper electrode plate of the charge sharing capacitor are short, the corresponding sub pixel appears to be a dark spot.

The present invention further provides a detection method of promoting defect detection rate, comprising steps of:

step 1, providing a liquid crystal display panel for detection, and the liquid crystal display panel comprises a plurality of charging scan lines, a plurality of common voltage signal lines, a plurality of charge sharing scan lines, a plurality of data signal lines and a plurality of pixels arranged in an array; each pixel comprises two areas of a main pixel and a sub pixel, and the sub pixel comprises a charge sharing thin film transistor and a charge sharing capacitor; a gate of the charge sharing thin film transistor is electrically coupled to a charge sharing scan line; the charge sharing capacitor is constructed by an ITO layer upper electrode plate, a metal lower electrode plate and an insulative layer sandwiched between the ITO layer upper electrode plate and the metal lower electrode plate; the ITO layer upper electrode plate and an ITO pixel electrode are in a same layer;

step 2, employing the ITO layer upper electrode plate as a pixel common electrode coupled to a common voltage signal line, and coupling the metal lower electrode plate to a drain of the charge sharing thin film transistor;

step 3, activating all the charging scan lines at the same time or by parity, and charging all the pixels or the pixels of the corresponding parity to make both the main pixel and the sub pixel at the same voltage level;

step 4, detecting a dark spot on the liquid crystal display panel, and that the short occurs to the ITO pixel electrode and the ITO layer upper electrode plate of the charge sharing capacitor in the sub pixel corresponded with the dark spot is detected.

In the step 2, the ITO layer upper electrode plate is employed as a pixel common electrode coupled to a common voltage signal line with a via hole.

The sub pixel further comprises a second thin film transistor, a second storage capacitor and a second liquid crystal capacitor coupled with one another; a gate of the second thin film transistor is electrically coupled to the charge scan line, and a source is electrically coupled to the data signal line, and a drain is electrically coupled to a source of the charge sharing thin film transistor; one end of the second storage capacitor is electrically coupled to the drain of the second thin film transistor, and the other end is electrically coupled to the common voltage signal line.

The main pixel comprises a first thin film transistor, a first storage capacitor and a first liquid crystal capacitor coupled with one another; a gate of the first thin film transistor is electrically coupled to the charge scan line, and a source is electrically coupled to the data signal line; one end of the first storage capacitor is electrically coupled to the drain of the first thin film transistor, and the other end is electrically coupled to the common voltage signal line.

The benefits of the present invention are: the present invention provides a pixel structure and a detection method of promoting defect detection rate, and by employing the ITO layer upper electrode plate as a pixel common electrode coupled to a common voltage signal line and coupling the metal lower electrode plate of the charge sharing capacitor to the charge sharing thin film transistor, as the ITO pixel electrode and the upper electrode plate of the charge sharing capacitor are short, the corresponding sub pixel appears to be a dark spot. The dark spot can be detected more easily which can raise the short detection rate between the ITO layer upper electrode plate of the charge sharing capacitor and the ITO pixel electrode, and improve the micro spot issue of the production. The yield is raised and the cost is diminished.

BRIEF DESCRIPTION OF THE DRAWINGS

The technical solution and the beneficial effects of the present invention are best understood from the following detailed description with reference to the accompanying figures and embodiments.

In drawings,

FIG. 7 is a flowchart of a detection method of promoting defect detection rate according to the present invention.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
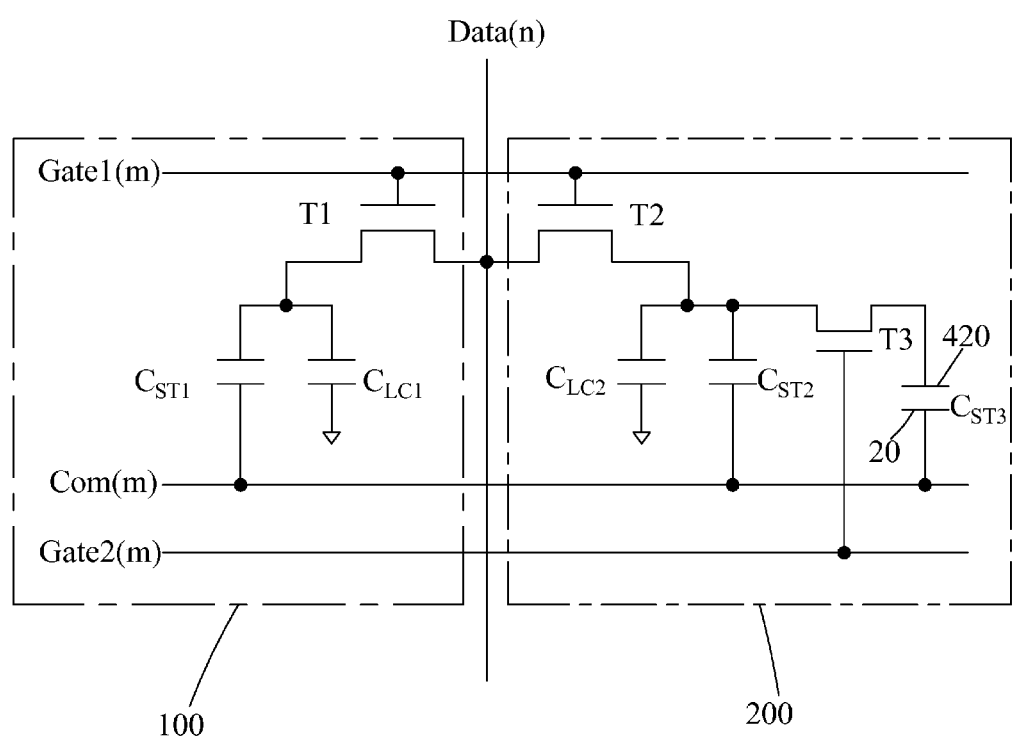
FIG. 1 is an equivalent circuit diagram of the pixel structure of charge sharing according to prior art.
Figure 2:
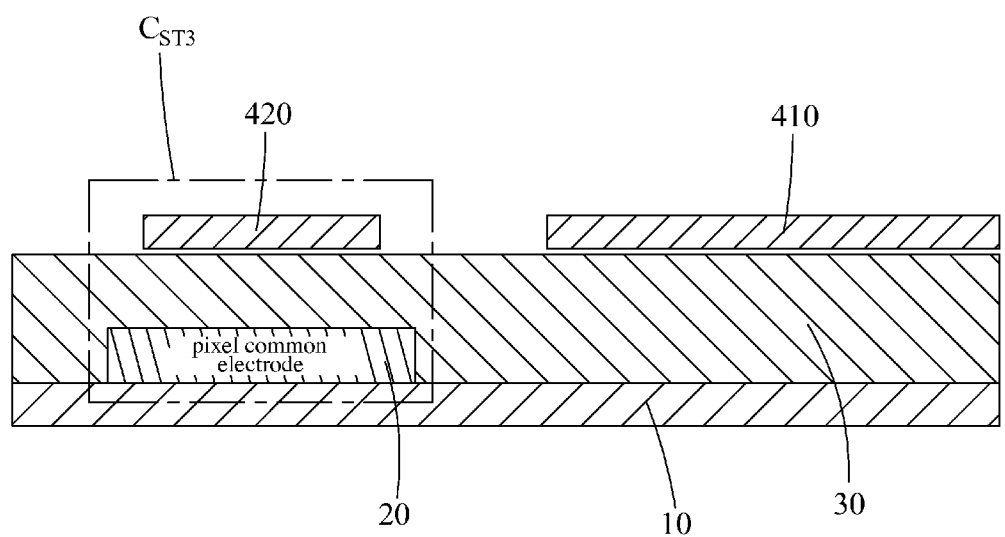
FIG. 2 is a sectional diagram of the charge sharing capacitor in the pixel structure of charge sharing according to prior art.
Figure 3:
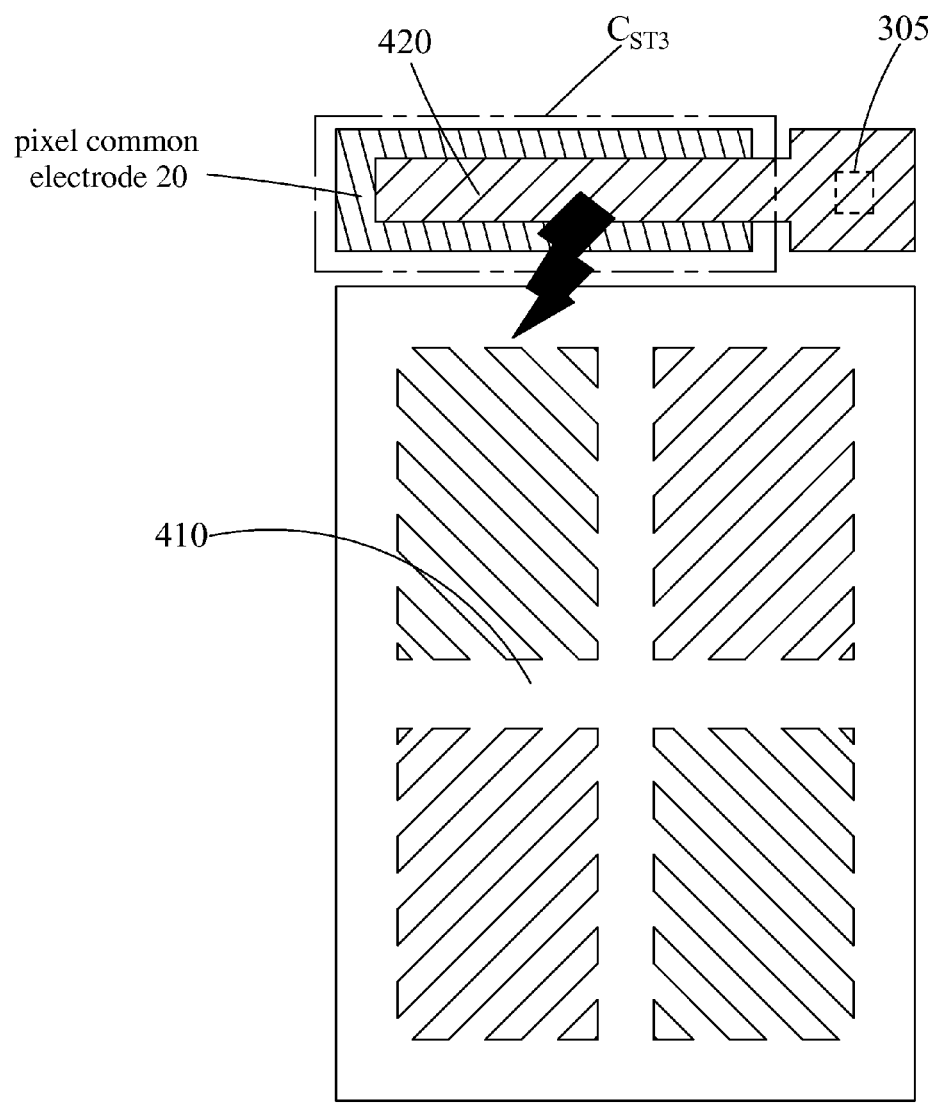
FIG. 3 is a top view diagram corresponding to FIG. 2.
Figure 4:
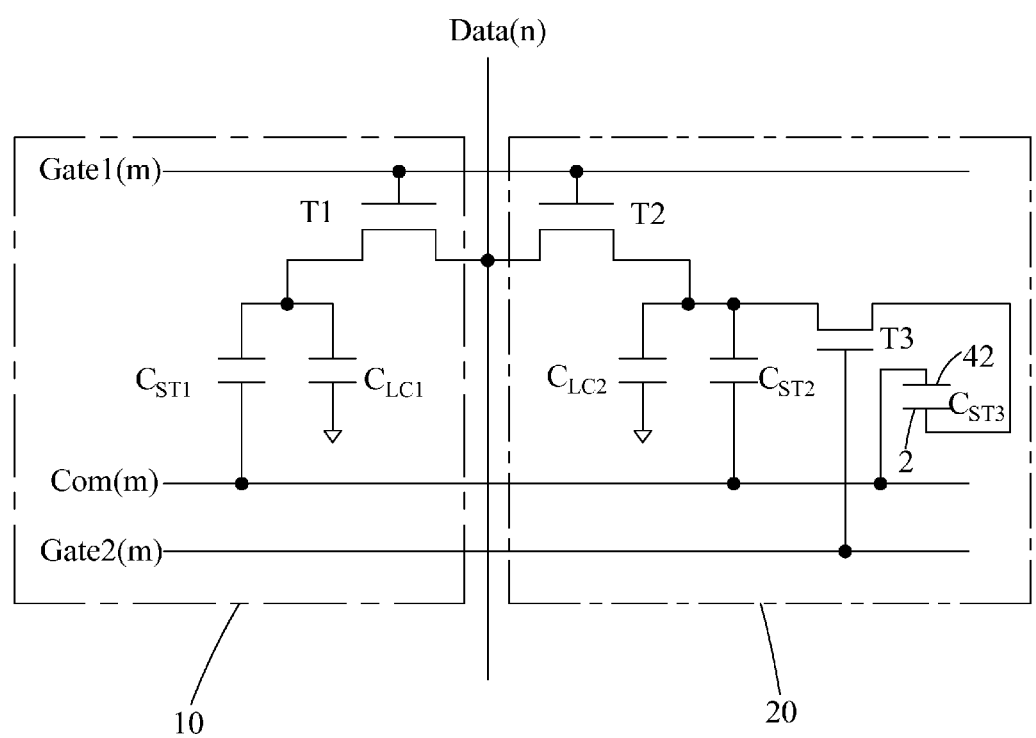
FIG. 4 is an equivalent circuit diagram of the pixel structure of promoting defect detection rate according to the present invention.
Figure 5:
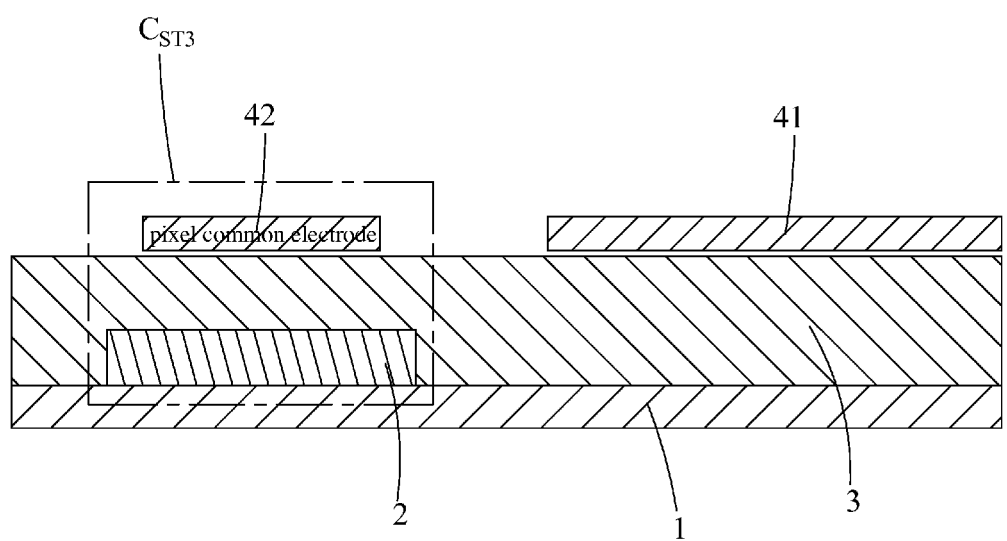
FIG. 5 is a sectional diagram of the charge sharing capacitor in the pixel structure of promoting defect detection rate according to the present invention.
Figure 6:
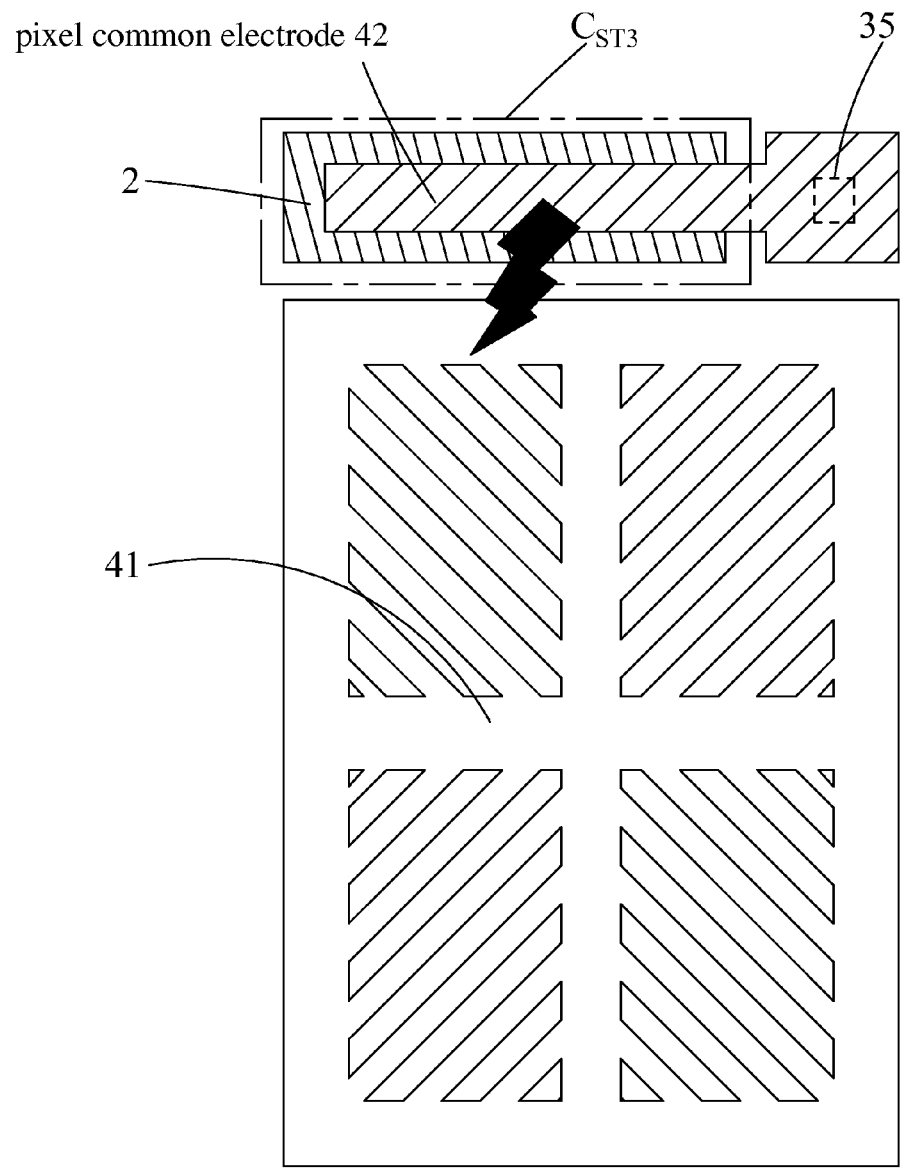
FIG. 6 is a top view diagram corresponding to FIG. 5.

Please refer from FIG. 4 to FIG. 6. The present invention provides a pixel structure of promoting defect detection rate, comprising two areas of a main pixel 10 and a sub pixel 20.

The main pixel 10 comprises a first thin film transistor T1, a first storage capacitor $C_{ST1}$ and a first liquid crystal capacitor $C_{LC1}$ coupled with one another; the sub pixel 20 comprises a second thin film transistor T2, a second storage capacitor $C_{ST2}$ and a second liquid crystal capacitor $C_{LC2}$, a charge sharing thin film transistor T3 and a charge sharing capacitor $C_{ST3}$.

Both the gates of the first thin film transistor T1 and the second thin film transistor T2 are electrically coupled to the charging scan line Gate1(m), and sources are both electrically coupled to the data line Date(n), and m and n are both positive integers, and Gate1(m) represents an mth charging scan line Gate 1, and Date(n) represents an nth data line Date; one ends of the first storage capacitor $C_{ST1}$, the second storage capacitor $C_{ST2}$, and the charge sharing capacitor $C_{ST3}$ are electrically coupled to the drain of the first thin film transistor T1, the drain of the second thin film transistor T2 and the drain of the charge sharing capacitor $C_{ST3}$, respectively, and the other ends are all electrically coupled to common voltage signal line Com(m), and Com(m) represents an mth common voltage signal line; the gate of the charge sharing thin film transistor T3 is electrically coupled to the charge sharing scan line Gate2(m), and the source is electrically coupled to the drain of the second thin film transistor T2, and Gate2(m) represents an mth charge sharing scan line Gate 2.

Furthermore, the charge sharing capacitor $C_{ST3}$ is constructed by an ITO layer upper electrode plate 42, a metal lower electrode plate 2 and an insulative layer 3 sandwiched between the ITO layer upper electrode plate 42 and the metal lower electrode plate 2, and both the metal lower electrode plate 2 and the insulative layer 3 are formed on a glass substrate 1. The ITO layer upper electrode plate 42 and an ITO pixel electrode 41 are in a same layer, and the ITO layer upper electrode plate 42 is employed as a pixel common electrode coupled to a common voltage signal line Com(m) with a via hole 35, and the metal lower electrode plate 2 is coupled to a drain of the charge sharing thin film transistor T3. Such structure is opposite to the prior art which the ITO layer upper electrode plate of the charge sharing capacitor is coupled to the drain of the charge sharing transistor, and the metal lower electrode plate is coupled to a common voltage signal line.

As normal display, the charging scan line Gate1(m) is activated, and meanwhile, the charge sharing scan line Gate2(m) is deactivated, and the main pixel 10 and the sub pixel 20 are at the same voltage level; then, the charging scan line Gate1(m) is deactivated, and meanwhile, the charge sharing scan line Gate2(m) is activated, with the function of the charge sharing capacitor $C_{ST3}$, the voltage level of the sub pixel 20 is lower than the voltage level of the main pixel 10. Different voltage levels make twisted distributions of the liquid crystal molecules in two display areas different. Accordingly, the effect of improving the color washout under wide view angle is obtained.

When the ITO residue issue occurs, and the short occurs to the ITO layer upper electrode plate 42 of the charge sharing capacitor $C_{ST3}$ and the ITO pixel electrode 41, the ITO pixel electrode 41 is right conducted with the ITO layer upper electrode plate 42 employed as the common electrode, and meanwhile, conducted with common voltage signal line Com(m). Consequently, the corresponding sub pixel 20 that short occurs under the same gray scale level appears to be a dark spot. Compared with micro spot, the dark spot is effectively detected easier which is beneficial for in time repair to raise the short detection rate between the ITO layer upper electrode plate 42 of the charge sharing capacitor $C_{ST3}$ and the ITO pixel electrode 41, and improve the micro spot issue of the production. The yield is raised and the cost is diminished.

Please refer to FIG. 7 with FIG. 4 to FIG. 6. The present invention further provides a detection method of promoting defect detection rate, comprising steps of:

step 1, providing a liquid crystal display panel for detection.

The liquid crystal display panel comprises a plurality of charging scan lines Gate1(m), a plurality of common voltage signal lines Com(m), a plurality of charge sharing scan lines Gate2(m), a plurality of data signal lines Date(n) and a plurality of pixels arranged in an array. Each pixel comprises two areas of a main pixel 10 and a sub pixel 20.

The main pixel 10 comprises a first thin film transistor T1, a first storage capacitor $C_{ST1}$ and a first liquid crystal capacitor $C_{LC1}$ coupled with one another; the sub pixel 20 comprises a second thin film transistor T2, a second storage capacitor $C_{ST2}$ and a second liquid crystal capacitor $C_{LC2}$, a charge sharing thin film transistor T3 and a charge sharing capacitor $C_{ST3}$.

The charge sharing capacitor $C_{ST3}$ is constructed by an ITO layer upper electrode plate 42, a metal lower electrode plate 2 and an insulative layer 3 sandwiched between the ITO layer upper electrode plate 42 and the metal lower electrode plate 2. The ITO layer upper electrode plate 42 and an ITO pixel electrode 41 are in a same layer.

Both the gates of the first thin film transistor T1 and the second thin film transistor T2 are electrically coupled to the charging scan line Gate1(m), and sources are both electrically coupled to the data line Date(n); one ends of the first storage capacitor $C_{ST1}$ and the second storage capacitor $C_{ST2}$ are electrically coupled to the drain of the first thin film transistor T1 and the drain of the second thin film transistor T2, respectively, and the other ends are both electrically coupled to common voltage signal line Com(m). A gate of the charge sharing thin film transistor T3 is electrically coupled to a charge sharing scan line Gate2(m), and a source is electrically coupled to a drain of the second thin film transistor T2.

step 2, employing the ITO layer upper electrode plate 42 of the charge sharing capacitor $C_{ST3}$ as a pixel common electrode coupled to a common voltage signal line Com(m) with a via hole 35, and coupling the metal lower electrode plate 2 to a drain of the charge sharing thin film transistor T3.

step 3, activating all the charging scan lines Gate1(m) at the same time or by parity, and charging all the pixels or the pixels of the corresponding parity to make both the main pixel 10 and the sub pixel 20 at the same voltage level.

step 4, detecting a dark spot on the liquid crystal display panel, and that the short occurs to the ITO pixel electrode 41 and the ITO layer upper electrode plate 42 of the charge sharing capacitor $C_{ST3}$ in the sub pixel 20 corresponded with the dark spot is detected.

When the short occurs to the ITO layer upper electrode plate 42 of the charge sharing capacitor $C_{ST3}$ and the ITO pixel electrode 41, the ITO pixel electrode 41 is right conducted with the ITO layer upper electrode plate 42 employed as the common electrode, and meanwhile, conducted with common voltage signal line Com(m). Consequently, the corresponding sub pixel 20 that short occurs under the same gray scale level appears to be a dark spot. Compared with micro spot, the dark spot is effectively detected easier to raise the short detection rate between the ITO layer upper electrode plate 42 of the charge sharing capacitor $C_{ST3}$ and the ITO pixel electrode 41, and improve the micro spot issue of the production. The yield is raised and the cost is diminished.

In conclusion, the present invention provides a pixel structure and a detection method of promoting defect detection rate, and by employing the ITO layer upper electrode plate as a pixel common electrode coupled to a common voltage signal line and coupling the metal lower electrode plate of the charge sharing capacitor to the charge sharing thin film transistor, as the ITO pixel electrode and the upper electrode plate of the charge sharing capacitor are short, the corresponding sub pixel appears to be a dark spot. The dark spot can be detected more easily which can raise the short detection rate between the ITO layer upper electrode plate of the charge sharing capacitor and the ITO pixel electrode, and improve the micro spot issue of the production. The yield is raised and the cost is diminished.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A pixel structure of promoting defect detection rate, comprising two areas of a main pixel and a sub pixel, and the sub pixel comprises a charge sharing thin film transistor and a charge sharing capacitor; a gate of the charge sharing thin film transistor is electrically coupled to a charge sharing scan line; the charge sharing capacitor is constructed by an ITO layer upper electrode plate, a metal lower electrode plate and an insulative layer sandwiched between the ITO layer upper electrode plate and the metal lower electrode plate; the ITO layer upper electrode plate and an ITO pixel electrode are in a same layer, and the ITO layer upper electrode plate is employed as a pixel common electrode coupled to a common voltage signal line, and the metal lower electrode plate is coupled to a drain of the charge sharing thin film transistor.

2. The pixel structure of promoting defect detection rate according to claim 1, wherein the ITO layer upper electrode plate is employed as a pixel common electrode coupled to the common voltage signal line with a via hole.

3. The pixel structure of promoting defect detection rate according to claim 1, wherein the sub pixel further comprises a second thin film transistor, a second storage capacitor and a second liquid crystal capacitor coupled with one another; a gate of the second thin film transistor is electrically coupled to the charge scan line, and a source is electrically coupled to the data signal line, and a drain is electrically coupled to a source of the charge sharing thin film transistor; one end of the second storage capacitor is electrically coupled to the drain of the second thin film transistor, and the other end is electrically coupled to the common voltage signal line.

4. The pixel structure of promoting defect detection rate according to claim 1, wherein the main pixel comprises a first thin film transistor, a first storage capacitor and a first liquid crystal capacitor coupled with one another; a gate of the first thin film transistor is electrically coupled to the charge scan line, and a source is electrically coupled to the data signal line; one end of the first storage capacitor is electrically coupled to the drain of the first thin film transistor, and the other end is electrically coupled to the common voltage signal line.

5. The pixel structure of promoting defect detection rate according to claim 1, wherein as the upper electrode plate of the ITO pixel electrode and the charge sharing capacitor are short, the corresponding sub pixel appears to be a dark spot.

6. A detection method of promoting defect detection rate, comprising steps of:
step 1, providing a liquid crystal display panel for detection, and the liquid crystal display panel comprises a plurality of charging scan lines, a plurality of common voltage signal lines, a plurality of charge sharing scan lines, a plurality of data signal lines and a plurality of pixels arranged in an array; each pixel comprises two areas of a main pixel and a sub pixel, and the sub pixel comprises a charge sharing thin film transistor and a charge sharing capacitor; a gate of the charge sharing thin film transistor is electrically coupled to a charge sharing scan line; the charge sharing capacitor is constructed by an ITO layer upper electrode plate, a metal lower electrode plate and an insulative layer sandwiched between the ITO layer upper electrode plate and the metal lower electrode plate; the ITO layer upper electrode plate and an ITO pixel electrode are in a same layer;

step 2, employing the ITO layer upper electrode plate as a pixel common electrode coupled to a common voltage signal line, and coupling the metal lower electrode plate to a drain of the charge sharing thin film transistor;

step 3, activating all the charging scan lines at the same time or by parity, and charging all the pixels or the pixels of the corresponding parity to make both the main pixel and the sub pixel at the same voltage level;

step 4, detecting a dark spot on the liquid crystal display panel, and that the short occurs to the ITO pixel electrode and the ITO layer upper electrode plate of the charge sharing capacitor in the sub pixel corresponded with the dark spot is detected.

7. The detection method of promoting defect detection rate according to claim 6, wherein in the step 2, the ITO layer upper electrode plate is employed as a pixel common electrode coupled to a common voltage signal line with a via hole.

8. The detection method of promoting defect detection rate according to claim 6, wherein the sub pixel further comprises a second thin film transistor, a second storage capacitor and a second liquid crystal capacitor coupled with one another; a gate of the second thin film transistor is electrically coupled to the charge scan line, and a source is electrically coupled to the data signal line, and a drain is electrically coupled to a source of the charge sharing thin film transistor; one end of the second storage capacitor is electrically coupled to the drain of the second thin film transistor, and the other end is electrically coupled to the common voltage signal line.

9. The detection method of promoting defect detection rate according to claim 6, wherein the main pixel comprises a first thin film transistor, a first storage capacitor and a first liquid crystal capacitor coupled with one another; a gate of the first thin film transistor is electrically coupled to the charge scan line, and a source is electrically coupled to the data signal line; one end of the first storage capacitor is electrically coupled to the drain of the first thin film transistor, and the other end is electrically coupled to the common voltage signal line.

10. A detection method of promoting defect detection rate, comprising steps of:
step 1, providing a liquid crystal display panel for detection, and the liquid crystal display panel comprises a plurality of charging scan lines, a plurality of common voltage signal lines, a plurality of charge sharing scan lines, a plurality of data signal lines and a plurality of pixels arranged in an array; each pixel comprises two areas of a main pixel and a sub pixel, and the sub pixel comprises a charge sharing thin film transistor and a charge sharing capacitor; a gate of the charge sharing thin film transistor is electrically coupled to a charge sharing scan line; the charge sharing capacitor is constructed by an ITO layer upper electrode plate, a metal lower electrode plate and an insulative layer sandwiched between the ITO layer upper electrode plate and the metal lower electrode plate; the ITO layer upper electrode plate and an ITO pixel electrode are in a same layer;

step 2, employing the ITO layer upper electrode plate as a pixel common electrode coupled to a common voltage signal line, and coupling the metal lower electrode plate to a drain of the charge sharing thin film transistor;

step 3, activating all the charging scan lines at the same time or by parity, and charging all the pixels or the pixels of the corresponding parity to make both the main pixel and the sub pixel at the same voltage level;

step 4, detecting a dark spot on the liquid crystal display panel, and that the short occurs to the ITO pixel electrode and the ITO layer upper electrode plate of the charge sharing capacitor in the sub pixel corresponded with the dark spot is detected;

wherein in the step 2, the ITO layer upper electrode plate is employed as a pixel common electrode coupled to a common voltage signal line with a via hole.

wherein the sub pixel further comprises a second thin film transistor, a second storage capacitor and a second liquid crystal capacitor coupled with one another; a gate of the second thin film transistor is electrically coupled to the charge scan line, and a source is electrically coupled to the data signal line, and a drain is electrically coupled to a source of the charge sharing thin film transistor; one end of the second storage capacitor is electrically coupled to the drain of the second thin film transistor, and the other end is electrically coupled to the common voltage signal line.

wherein the main pixel comprises a first thin film transistor, a first storage capacitor and a first liquid crystal capacitor coupled with one another; a gate of the first thin film transistor is electrically coupled to the charge scan line, and a source is electrically coupled to the data signal line; one end of the first storage capacitor is electrically coupled to the drain of the first thin film transistor, and the other end is electrically coupled to the common voltage signal line.

\* \* \* \* \*